Aug. 4, 1931.  F. V. SCHROEDER  1,817,272
SAW SETTING DEVICE
Filed June 1, 1928
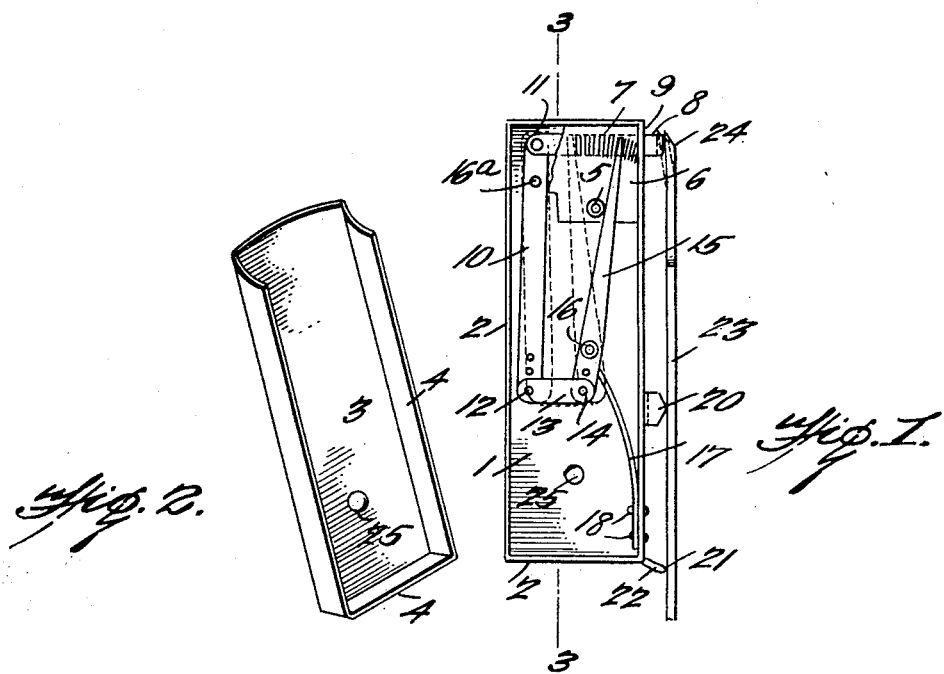
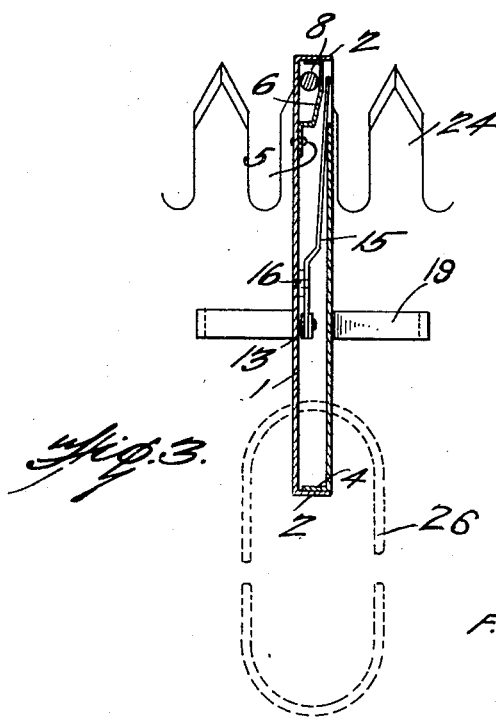
INVENTOR
F. SCHROEDER,
BY
F. P. Lorin
ATTORNEY Patented Aug. 4, 1931

1,817,272

UNITED STATES PATENT OFFICE

FRANK V. SCHROEDER, OF ISSAQUAH, WASHINGTON

SAW SETTING DEVICE

Application filed June 1, 1928. Serial No. 282,161.

This invention relates to improvements in saw setting devices and has for its principal object to provide a device of this character, by the use of which the exact set of all the teeth of a saw blade may be accomplished with great accuracy so that one-half the number of teeth will be set so that their points or cutting edges will lie exactly within a common plane, and the same be true of the remaining teeth.

It is known that any tooth or teeth which project beyond the predetermined plane to which the teeth are to be set, will do all the cutting upon that side of the saw blade itself, while those teeth which do not project so far will do little or no cutting at all. By the use of my device, it is possible to conveniently and quickly set the saw so that each tooth does its apportionate part of the cutting.

I accomplish these and other objects of my invention by the peculiar arrangement and combination of the parts as will be more fully hereinafter described and explained in the following specification, shown in the accompanying drawings and finally pointed out in the appended claim.

In the drawings:

Figure 1 is a top plan view of my device with the cover removed.

Figure 2 is a view of the cover.

Figure 3 is a vertical sectional view upon the line 3—3 of Figure 1.

Referring now more particularly to the drawings, 1 indicates a casing having its sides and ends upturned, as at 2, 3 indicates a cover having its sides and one of its ends upturned, as at 4, so that the cover may be readily sprung into the casing. Secured to the bottom of the casing at 5 is a sheet metal bracket 6 upon whose upper surface is formed a scale 7. The cover is of less height than the corresponding portion of the casing to provide an opening above the upper edge of the cover through which reading may be had.

Between the bottom and the bracket 6 is a rod 8, slidably mounted within an aperture 9 in one of the upturned edges of the casing. 10 is a lever, one of whose ends is pivotally connected at 11 to the inner end of the rod 8 and its opposite end similarly connected at 12 to one end of a link 13. The other end of the link 13 is pivotally connected at 14 to the lower end of a pointer 15, which is in turn pivoted at 16 to the bottom of the casing, by which arrangement it will be seen that the movement of the free end of the pointer 15 is relatively very great compared with the movement of the opposite end of the pointer, resulting in a micrometer action of the pointer.

The lever 10 is also pivoted at $16^a$ to the bottom of the casing. 17 is a leaf spring, one of whose ends is secured at 18 to one of the upturned edges 2 of the casing. The free end of the spring bears on the lower end of the pointer 15 in a plane beneath the pivot point 16. 19 is a cross bar secured to one edge of the casing and having each of its ends downwardly turned as at 20, so that these ends lie within the same plane with the extremity 21 of a projection 22, extending from the same side of the casing, and normally the free end of the rod 8 lies within that same plane.

23 indicates a saw blade. 24 indicates the tooth. 25 indicates an aperture through the cover and bottom of the casing respectively, through which a strap or cord 26 is passed to form a loop, as plainly indicated in Figure 3, and through which the entire device may be conveniently supported upon the wrist of the operator, when not in use.

Assuming that the teeth of the saw are to be set, the operator places the casing into its position with respect to the saw blade, as shown in Figure 1, and notes the action of the free end of the pointer. If the set already in the tooth 24 is about as indicated in Figure 1 in full lines, then the pointer will have been caused to move in contra-clockwise direction about to the position as shown in full lines in that figure. If, however, the set of the tooth was such as is indicated by the dotted lines of the tooth in Figure 1, then the free end of the pointer would have of course moved to a greater distance around its center 16, and to about the position as seen in dotted lines. If the operator has predetermined upon a set of the teeth which will cause the pointer to move, for example, to its position as seen in full lines, then if upon his placing the device into its position as seen in Figure 1, the free end of the pointer has not moved to its full lined position, then the operator strikes the tooth with his usual swaging tool so as to bend the tooth still farther towards the left, as seen in Figure 1. He then places the device into position again and swaging either from one side or the other until the pointer is in exact position to determine the set of the tooth. It will be noted that a very slight movement of the rod 8 will, through the arrangement of the various fulcrums, cause a relatively large movement of the free end of the pointer, so that a very minute adjustment or set of the teeth is accomplished.

While I have shown a particular form of embodiment of my invention, I am aware that many minor changes therein will readily suggest themselves to others skilled in the art without departing from the spirit and scope of my invention. I therefore desire to avoid being limited to the exact form of embodiment which I have herein shown and described.

What I claim is:

A saw tooth gauging device comprising a substantially thin, rectangular shaped casing, a cross bar having outturned ends secured to one side of the casing, a projection secured to the same side adjacent one end thereof, the extremities of said cross bar and said projection being in the same plane, a movable rod projecting through the said same side adjacent the opposite end and adapted to engage the teeth of the saw, a sheet metal bracket secured to and within the casing and substantially housing the rod, said sheet metal bracket having a scale on one face, a pivoted lever connected to said rod at one end, a link connected to the free end of said lever, a pointer connected to said link and arranged to move across said scale, whereby the indicator may be read through an opening in said casing, the sheet metal bracket separating the pointer and the rod, thereby preventing contact between the two, and a spring for normally maintaining the pointer in zero position.

In testimony whereof I affix my signature.

FRANK V. SCHROEDER.